United States Patent [19]
Phillips et al.

[11] 4,166,921
[45] Sep. 4, 1979

[54] FLEXIBLE HOUSING, IN-LINE ELECTRONIC

[75] Inventors: Raymond J. Phillips, Oakdale; Anthony R. Susi, Waterford, both of Conn.

[73] Assignee: The United States of America as represented by the Secretary of the Navy, Washington, D.C.

[21] Appl. No.: 828,710

[22] Filed: Aug. 29, 1977

[51] Int. Cl.² ............................................. H02G 9/00
[52] U.S. Cl. .................................. 174/70 S; 138/109; 174/24; 174/68 C
[58] Field of Search ................. 174/70 S, 70 R, 70 A, 174/24, 41, 47, 68 R, 68 C, 74 R; 138/109, 118

[56] References Cited
U.S. PATENT DOCUMENTS 3,006,792  10/1961  Monelli ............................. 174/70 S
4,009,733  3/1977  Schnabel ........................ 138/109 X Primary Examiner—Roy N. Envall, Jr.
Attorney, Agent, or Firm—Richard S. Sciascia; Arthur A. McGill; Prithvi C. Lall

[57] ABSTRACT

A housing assembly taking the place of strength members in cables for inserting electrical and/or electronic equipment. The assembly comprises cylindrical end terminations interlocking with cable termination pieces. The end terminations have strength members attached. The strength members comprise steel wire strands woven or braided in a basket-weave configuration. The strength members are attached to the end termination pieces by swaging an internal into an outside sleeve, and at the same time sandwiching the strength members between the sleeves. A flexible tube is inserted in the housing assembly to serve as a sealing surface for external water pressure.

3 Claims, 2 Drawing Figures

FLEXIBLE HOUSING, IN-LINE ELECTRONIC

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to a housing assembly for electrical and electronic equipment and more particularly to an in-line assembly that is compatible with a plurality of existing antenna systems now in use aboard submarines.

One of the requirements of in-line equipment, such as connectors, fittings and housings in many systems is that the components do not exceed the diameter of the cable or wire that is to be used in conjunction with the components. This enables each component to be compatible with the existing stuffing tubes, seals and mechanisms that are normally found. In addition, an optimum housing assembly must provide a maximum amount of useable space internally for the components it must house.

In comparison to the present invention, prior art systems are generally heavy, are less flexible, have less tensile strength, and under increasing tensile loading have a tendency to continue to stretch.

SUMMARY OF THE INVENTION

It is, therefore, a general object of the present invention to provide an improved in-line housing assembly for electrical and/or electronic equipment. Another object is that the housing has a diameter not larger than the electrical cable it services. Further objects are that the housing assembly be lighter, more flexible and relatively inexpensive when compared with prior art systems. Additional objects are that the assembly has almost no stretch at normal tensile loading and only slight stretch at maximum tensile loading. These and other objects of the invention and the various features and details of construction and operation will become apparent from the specification and drawings.

This is accomplished in accordance with the present invention by providing a housing assembly that is adapted to connect with a cable termination assembly. The connecting portion of the housing includes an end termination that has an inner piece and an outer piece swaged together with steel interwoven wires sandwiched between the inner and outer pieces. A flexible coating is affixed to the steel wires. Components that form a watertight seal form an interior portion of the housing.

DESCRIPTION OF THE PREFERRED EMBODIMENTS

Figure 1:
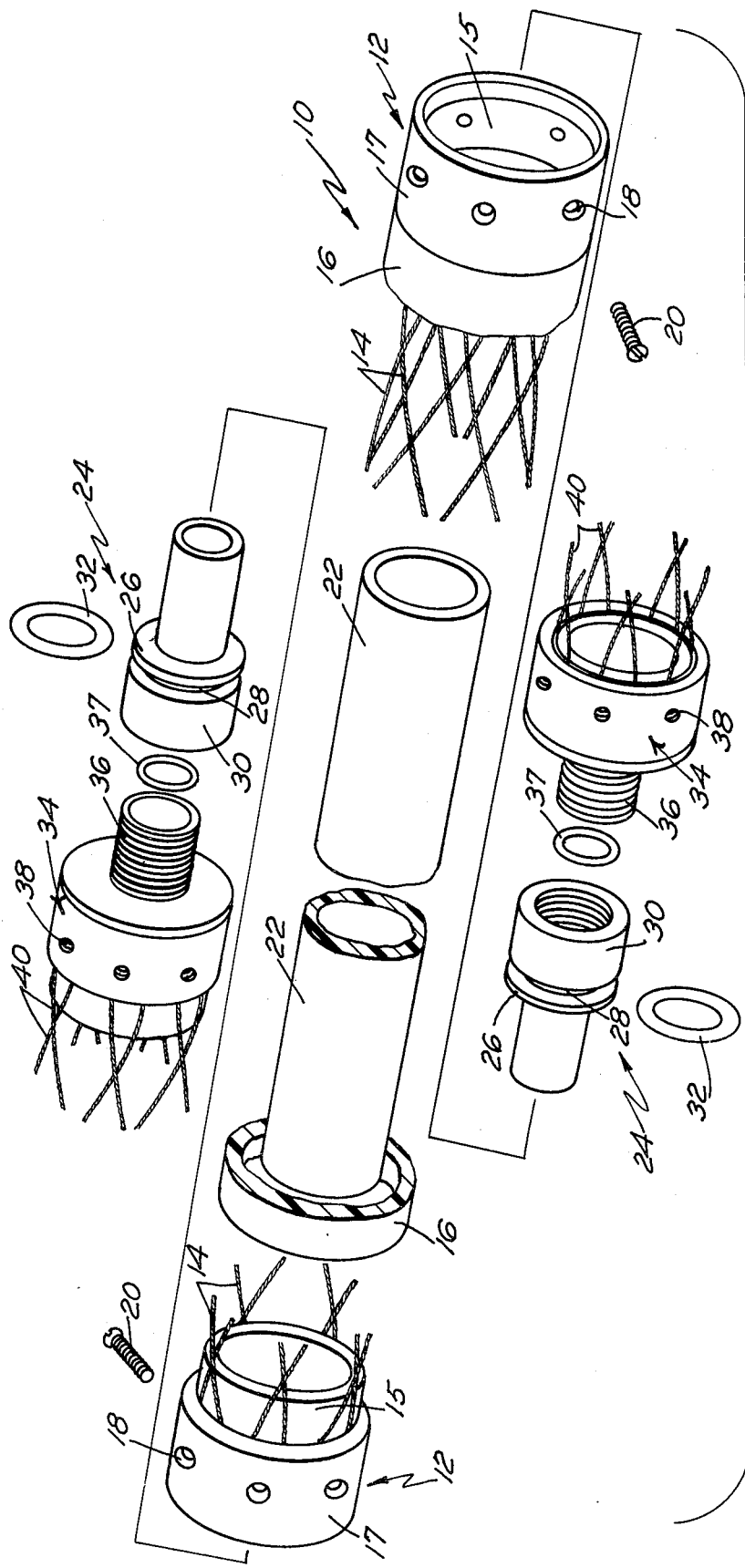
FIG. 1 is an exploded view of in-line components in accordance with the present invention.
Figure 2:
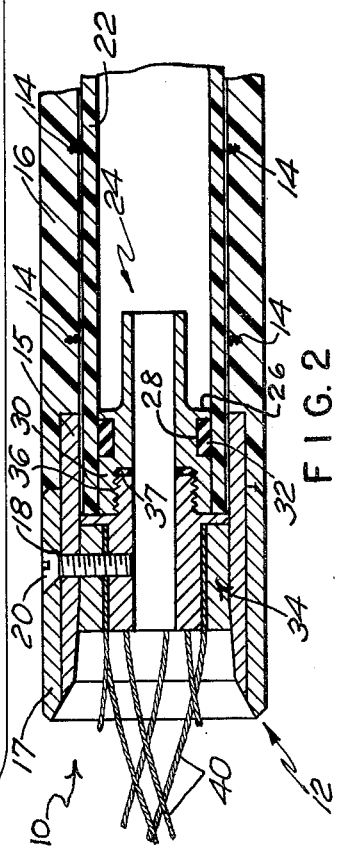
FIG. 2 is a sectional view of in-line components shown in FIG. 1.

Referring now to FIGS. 1 and 2, there are shown a flexible housing 10 and some associated components that aid one in understanding how housing 10 can be used in an assembly. The housing 10 comprises a pair of end terminations 12, strength members 14 and a coating 16 of a flexible material.

The end terminations 12 each have five countersunk holes 18 adaptable for holding flat head machine screws 20. The end terminations 12 are formed of an inside sleeve 15 and an outside sleeve 17 that are swaged together. Steel wires, woven or braided in a basket-weave configuration, comprise strength members 14. The ends of these steel wires are affixed to end terminations 12 by means of sandwiching the steel wires between inside and outside sleeves 15, 17. The strength members 14 are coated, or molded over, with the flexible material urethane. The urethane is cast or injected into a suitable mold so as to provide predetermined inside and outside dimensions.

A flexible tube 22 is inserted inside housing 10 to serve as a sealing surface if the housing assembly is to be subjected to external water pressure. A stainless steel O-ring retainer 24 having a flange 26, neck portion 28 and head 30 holds O-ring 32 on its neck portion 28. The retainer 24 is inserted in flexible tube 22 forming a watertight fit.

End pieces 34 connect to respective end terminations 12. Each piece 34 has a cylindrical projection 36 that fits into head 30 of retainer 24. An O-ring 36 forming a dielectric seal is inserted between projection 36 and head 30. The end pieces 34 have apertures 38 for alignment with countersunk holes 18 of terminations 12. The end pieces 34 fit inside end terminations 12 and are aligned so that machine screws 20 can be inserted into countersunk holes 18 and apertures 38. Each end piece 34 has strength members 40.

There has therefore, been described a flexible housing 10 that is suitable for carrying electrical and electronic equipment such as amplifiers, relays, etc. The electrical and electronic equipment are connected in any known manner to cables that are held by strength members 40 and terminate at end pieces 34. The flexible housing 10 permits a signal to be operated upon in a cable rack or stuffing tube where no cross sectional part of the housing 10 exceeds the maximum diameter of the cable with its associated strength member 40.

It will be understood that many additional changes in the details, materials, steps and arragement of parts, which have been herein described and illustrated in order to explain the nature of the invention, may be made by those skilled in the art within the principle and scope of the invention as expressed in the appended claims.

What is claimed is:

1. An in-line electronic flexible housing comprising:
   a pair of cylindrical end terminations with each of said terminations incuding an interior and an exterior cylindrical piece;
   strand strength members arranged in a basket weave configuration attached to each of said cylindrical end terminations;
   a flexible material enclosing and attached to said strength members, said flexible material slipped over a portion of each interior cylindrical piece and abutting an end of each exterior cylindrical piece, said flexible material having an outer diameter substantially equal to the outer diameter of each exterior cylindrical piece; and
   water sealing means for keeping the interior of said flexible housing watertight enclosed inside said cylindrical end terminations, said strength members and said flexible material, said water sealing means includes an inner sleeve, a pair of O-ring retainers with each of said retainers inserted in opposing ends of said inner sleeve, a pair of first O-rings with each of said first O-rings inserted between each of said retainers and said inner sleeve, and a pair of second O-rings with each of said second O-rings inserted in the interior of each of said retainers.

2. An in-line electronic flexible housing according to claim 1 wherein each of said cylindrical end terminations further comprises a pair of pieces swaged together with respective ends of said wire strength members sandwiched therebetween.

3. An in-line electronic flexible housing according to claim 2 wherein said cylindrical end terminals are adapted for connecting said in-line electronic flexible housing with mating components.

* * * * *